Feb. 28, 1967  C. O. DIMMOCK, JR  3,306,269
ROTARY COMPRESSION COMBUSTION ENGINE
Filed July 13, 1964  6 Sheets-Sheet 1

INVENTOR
CLARENCE O. DIMMOCK, JR
BY
Norman H. Schuttler
ATTORNEY

Feb. 28, 1967  C. O. DIMMOCK, JR  3,306,269
ROTARY COMPRESSION COMBUSTION ENGINE
Filed July 13, 1964  6 Sheets-Sheet 2

INVENTOR
CLARENCE O. DIMMOCK, JR.
BY
Norman F. Schuttler
ATTORNEY

Feb. 28, 1967 C. O. DIMMOCK, JR 3,306,269
ROTARY COMPRESSION COMBUSTION ENGINE
Filed July 13, 1964 6 Sheets-Sheet 3
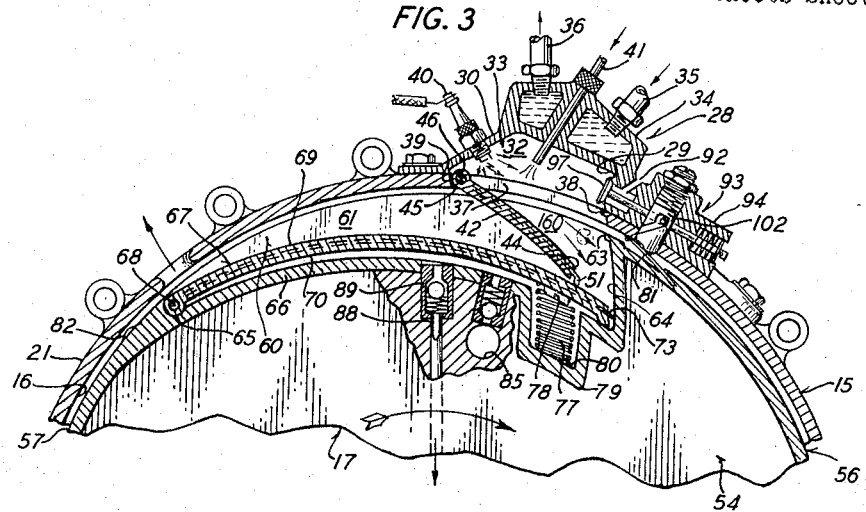
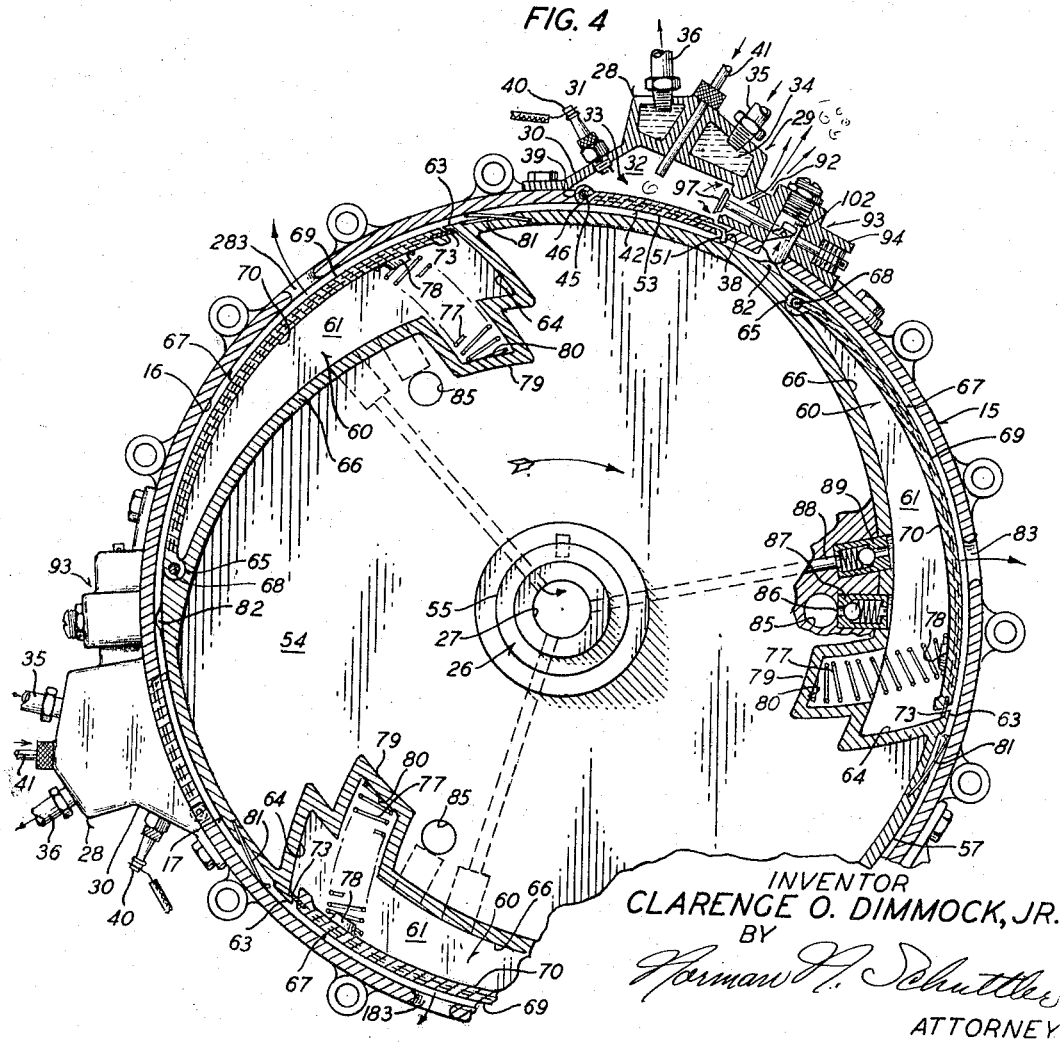
INVENTOR
CLARENCE O. DIMMOCK, JR.
BY
ATTORNEY

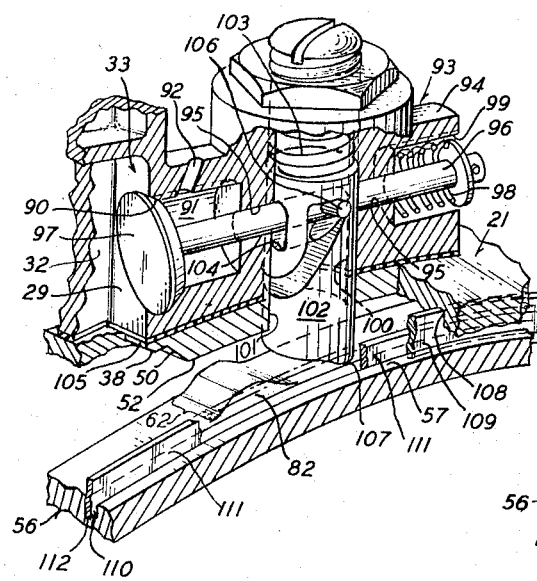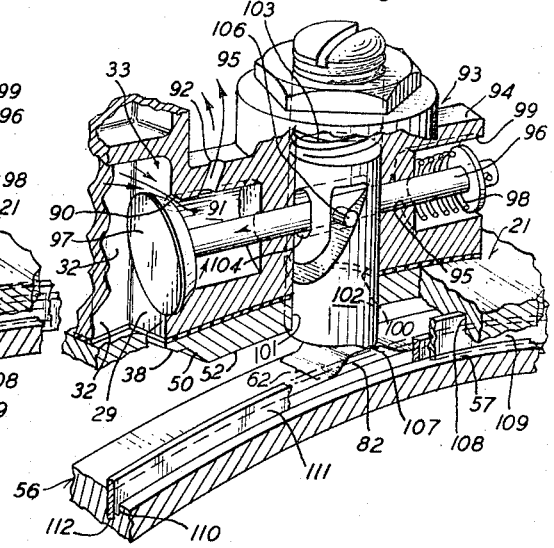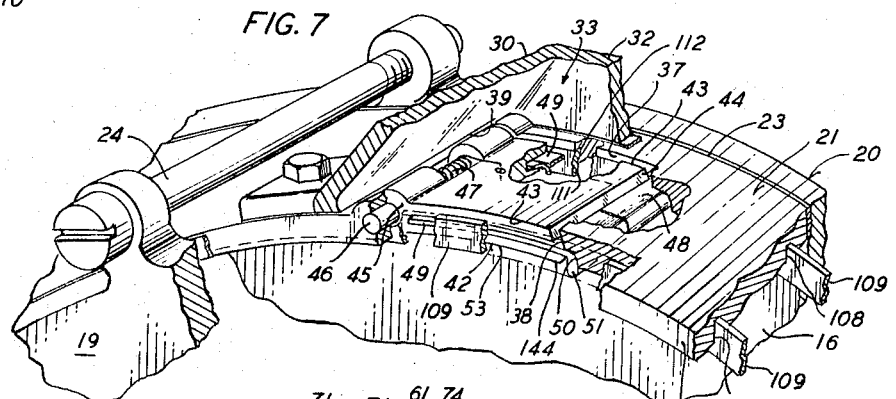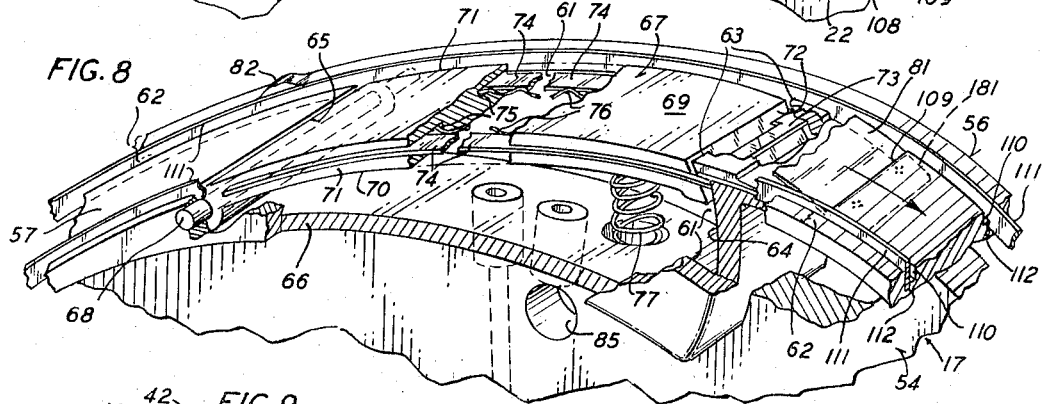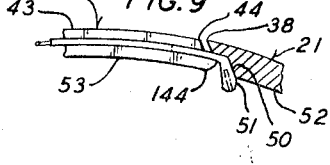
INVENTOR
CLARENCE O. DIMMOCK, JR.
ATTORNEY Feb. 28, 1967  C. O. DIMMOCK, JR  3,306,269
ROTARY COMPRESSION COMBUSTION ENGINE
Filed July 13, 1964  6 Sheets-Sheet 6
FIG. 13
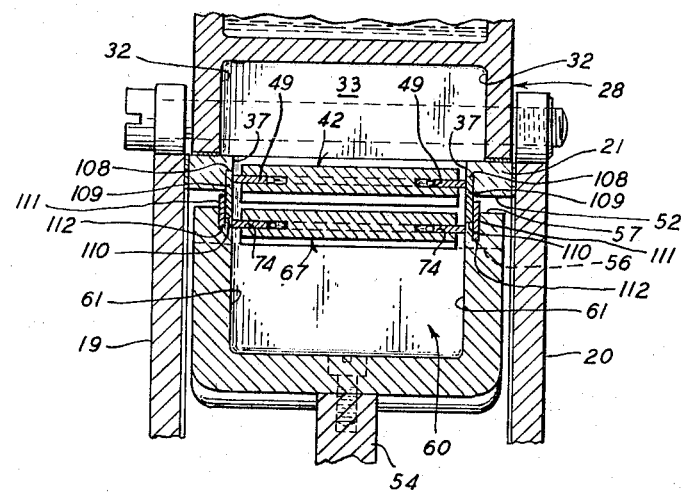
FIG. 14
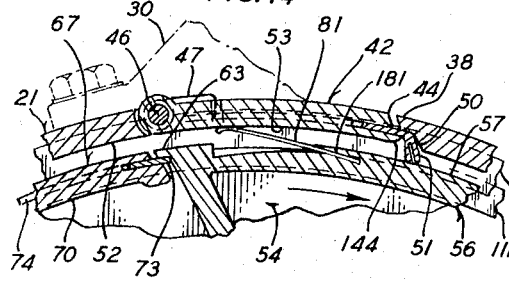
FIG. 14A
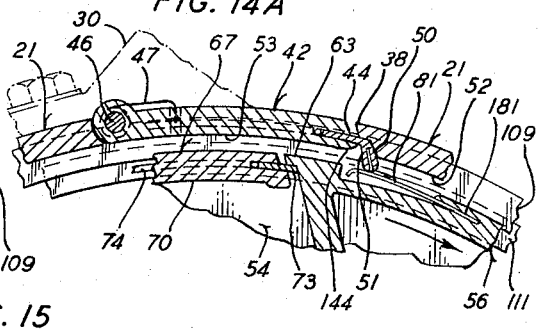
FIG. 15
FIG. 16
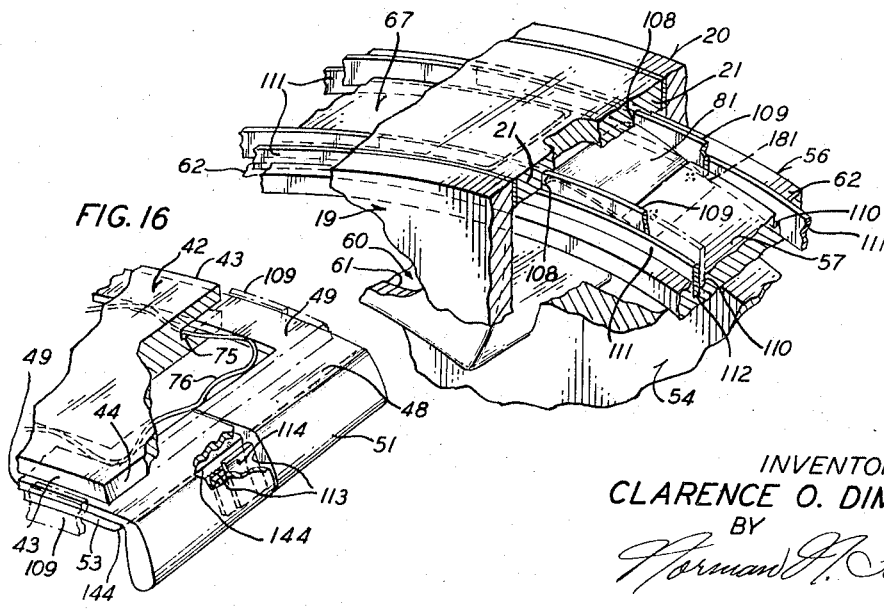
INVENTOR
CLARENCE O. DIMMOCK, JR.
BY
Norman P. Schuttler
ATTORNEY

United States Patent Office 3,306,269
Patented Feb. 28, 1967

3,306,269
ROTARY COMPRESSION COMBUSTION ENGINE
Clarence O. Dimmock, Jr., 148 Hampton Road, Garden City, N.Y. 11040
Filed July 13, 1964, Ser. No. 382,003
9 Claims. (Cl. 123—15)

The present invention relates to rotary compression combustion engines in which the power delivering rotor is rotated by the force of expanding gases, resulting from firing a fuel charge in a combustion chamber carried by stator structure of the engine, when such force is directed against a generally radially-extending transverse impaction face carried by the rotor.

Prior to the present invention many proposals have been made in an effort to product operable forms of such an engine. Many of them were inoperable due to failure of their designers to understand that pressure of expanding gases resulting from the firing of a fuel charge is exerted equally in all directions. In a piston engine an expansion chamber is defined between the cylinder sidewall and the head combustion recess to which a fuel mixture is fed and there fired by suitable ignition means, and a piston mounted for reciprocation in the cylinder to deliver power by means of a piston rod attached thereto. When the piston is in a position near the head and a compressed fuel charge therebetween is fired driving force is applied continuously to the piston during its stroke of retraction by expanding gases resulting from progressive burning of the fuel in the constantly enlarging cylinder chamber. It is an object of the present invention to provide a rotary compression combustion engine which structurally embodies such a progressively enlarging chamber having a transverse impaction face at the forward end carried by the rotor for impingement of force thereagainst by the expanding gases to rotate the rotor forward in an effective manner.

The present engine accomplishes this purpose by providing the compression and ignition recess in the form of a combustion chamber in the inner cylindrical face of stator structure and an expansion chamber section in the form of a pocket in the opposed circumferential rim of a rotor, which is rotatably supported in the stator structure, with the leading end of the pocket defined by an impaction face oriented generally radial in the rotor. The trailing end of the pocket is communicable to the combustion chamber at the time of firing together to define an elongated expansion chamber extending generally tangentially of the rotor forward to the generally radial leading impaction face, with this expansion chamber being capable of progressively enlarging longitudinally as the rotor rotates forward with maintenance of the communication between its stator combustion chamber section and its rotor pocket section. Unique valving structure is provided whereby the stator combustion chamber is kept closed while a compressed fuel charge is developed therein and the rotor pocket is closed at its trailing end until the compressed fuel charge is fired in the former. Thereupon the valving structure is manipulated to open position to convert the pocket into a rotor expansion chamber section with the impaction face constituting the leading wall thereof and to communicate its trailing open end to the stator combustion chamber section while cooperating with adjacent structure to provide closing sidewall structure of the resulting composite expansion chamber that permits progressive longitudinal enlargement of the latter in an effective manner while suitably maintaining the closed condition of this active composite expansion chamber until intentional exhaustion of spent gases therefrom. It is another object of this invention to provide this engine and its unique valving structure in a structural form which accomplishes this purpose in a practical way.

A further object of the present invention is to provide in such engine the unique valving structure in the form of a plurality of pivotally mounted plate valve means, with some pivotally mounted to the stator and others pivotally mounted on the rotor, which upon firing of a fuel charge compressed in the combustion chamber will be swung inwardly together in overlapping relation, so as cooperatively to form the inward side of the active composite expansion chamber while permitting in forward rotation of the rotor effective progressive elongation of this chamber by relative slide of the rotor plate valve means with respect to the stator plate valve means while maintaining substantially fluid-tight contact therebetween.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 3 is a sectional detail, with parts broken away, of a portion of the structure shown in FIG. 2, illustrating relative positions of parts of the rotor pocket, the stator combustion chamber and the valve means which normally close them at a time immediately after the firing of the fuel charge in the combustion chamber;

FIG. 4 is a sectional view taken through the stator and rotor structures shown in FIG. 2, with parts broken away, with the section taken on a plane normal to the axis of the rotor, showing relative positions of parts in the exhaust position of the rotor;

FIG. 5 is a perspective detail, with parts broken away and in section, showing scavenging valve structure in the closed position just prior to the opening thereof;

FIG. 6 is a view similar to FIG. 5, showing the opening of the scavenging valve for sweep of spent gases from the stator combustion chamber;

FIG. 7 is an enlarged perspective detail, with parts broken away and in section, of stator structure and the combustion chamber carried thereby, showing details of the pivoted stator plate valve in a position of closure of the open face of the combustion chamber;

FIG. 8 is an enlarged perspective detail, with parts broken away and in section, of a pocket carried by the rotor and showing details of the construction of the pivoted rotor valve plate which normally closes the open face thereof;

FIG. 9 is a detail view, with parts broken away and in section, illustrating gasketing of the nose of the stator valve plate to adjacent stator structure in the combustion chamber-closing position of this valve plate as illustrated in FIG. 7;

Figure 2:
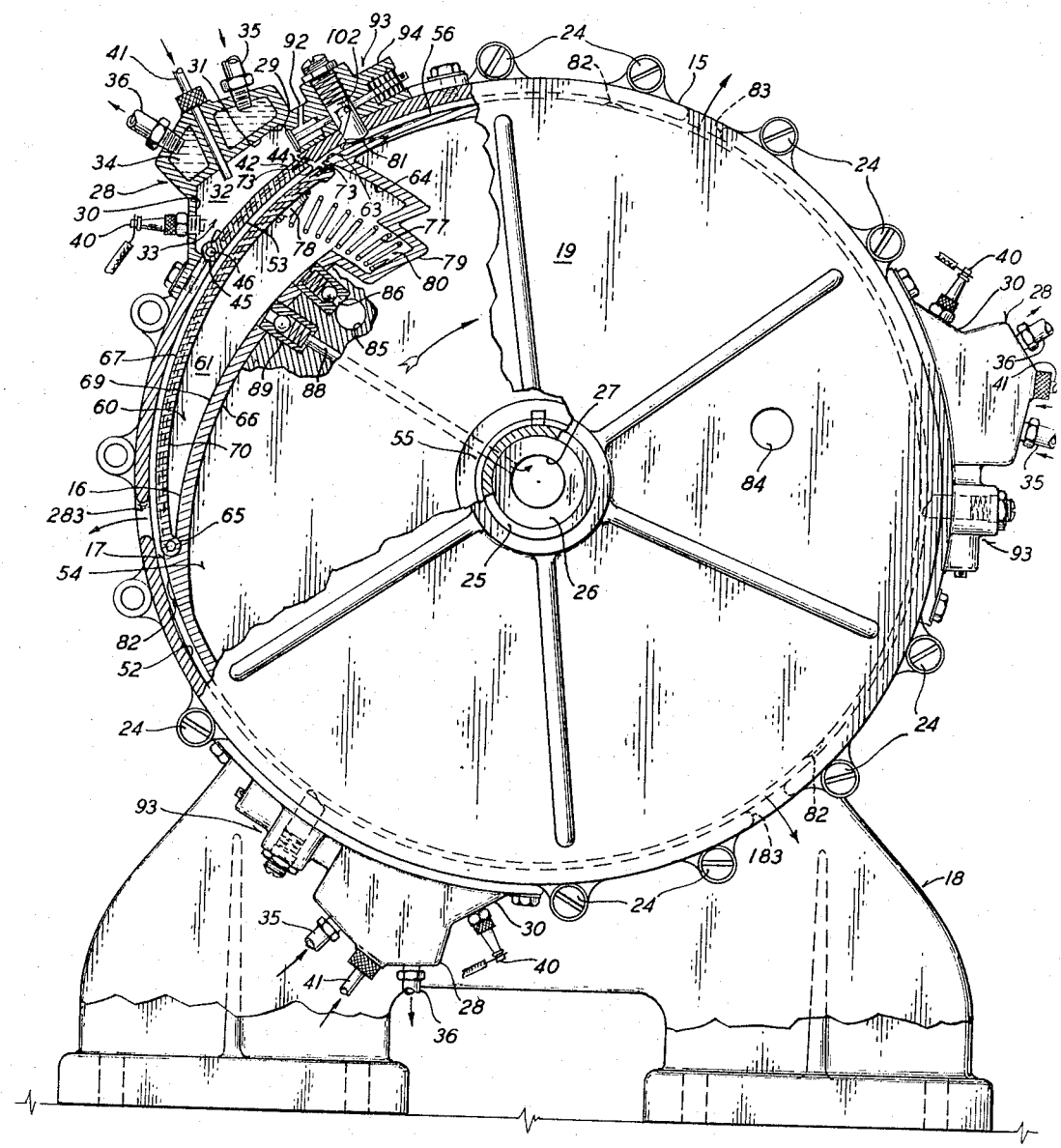
FIG. 2 is a side elevational view, with parts broken away and in section, of the engine depicted in FIG. 1, showing relative positions of a closed rotor pocket and a closed stator combustion chamber with the latter having a compressed fuel charge therein just prior to the firing of the latter.

FIG. 13 is an enlarged transverse sectional view, with parts broken away, taken through a combustion chamber recess and an aligned rotor pocket, with their respective closing valve plates shown in the retracted closed positions, as in the upper left hand portion of FIG. 2, and illustrating annular gas sealing rings flanking both which cooperatively avoid undue leakage of gases during firing from the composite expansion chamber into the stator chamber in which the rotor is rotatively supported;

FIG. 14 is a longitudinal sectional detail, with parts broken away, of a portion of the stator at one of the combustion chamber structures showing the valve plate thereof in its combustion recess closing or retracted position with the cooperative rotor pocket advancing theretoward while being closed by its retracted valve plate as the latter approaches alignment with the stator valve plate, showing transverse wiping means carried by the rotor immediately preceding the leading end of the rotor pocket for leakage minimizing cooperation with the annular sealing rings illustrated in FIG. 13;

FIG. 14A is a sectional detail similar to FIG. 14 showing relative positions of parts in further advance of the rotor while still approaching alignment of the rotor pocket closing valve plate with the stator combustion recess closing valve plate, illustrating drag of the wiping nose or lip of the latter over the leading transverse wiping means of the rotor with momentary retraction of this rotor wiping means;

FIG. 15 is a perspective detail, with parts broken away and in section, of opposed portions of the cylindrical stator closing plate and opposed rotor rim structure, showing mount of the annular sealing rings illustrated in FIGS. 13, 14 and 14A in annular channels provided in the opposed cylindrical stator closing wall and rotor rim, and illustrating the location of the transverse wiping means of the rotor between these sealing rings; and FIG. 16 is a perspective detail, with parts broken away and in section, of the forward end of one of the combustion recess closing valve plates illustrating split of the wiping lip thereof permitting sealing wipe of its side legs against the inboard sides of the stator annular sealing rings shown in FIGS. 13, 14, 14A and 15.

Referring to the drawings, in which like numerals identify similar parts throughout, it will be seen from FIGS. 1 to 4 incl. that the embodiment of the engine illustrated therein includes a stator casing 15 in which a cylindrical chamber 16 is defined with a rotor structure 17 rotatably mounted in the latter. The stator structure 15 is suitably supported in a fixed manner, such as by being mounted upon a standard or base structure 18 shown in FIGS. 1 and 2. The stator structure 15 has opposed sidewalls which may be provided in the form of similar disks 19 and 20 transversely spaced by an intervening enclosing cylindrical wall 21. Opposite side edges 22 and 23 of the cylindrical wall 21 are suitably gasketed and clamped to marginal zones of the inside faces of the sidewall disks 19 and 20, such as by a plurality of tie bolts 24. Each stator sidewall disk 19 or 20 centrally carries one of a pair of shaft bushings 25 which rotatably support a through rotor-driven shaft 26 which is to deliver motive power, and which may for a purpose indicated hereinafter be hollow to provide a fluid delivery passage 27.

Figure 1:
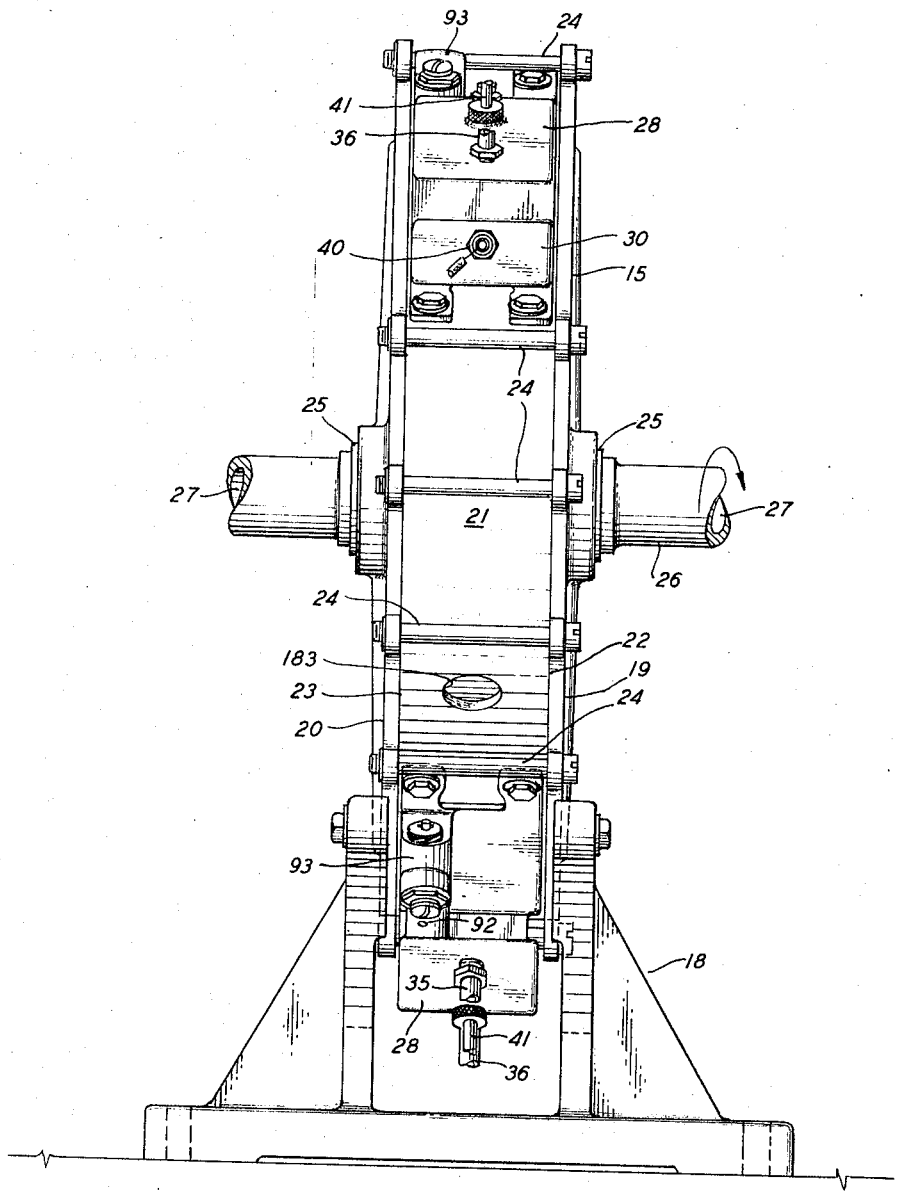
FIG. 1 is an end elevational view, with parts broken away, of an embodiment of the rotary engine of the present invention.

The transversely-extending, cylindrical enclosing wall 21 of the stator casing 15 is provided with one or more combustion chamber structures or unit assemblies 28 which, as will be understood from FIGS. 1, 2 and 4 may be three in number located thereabout at 120° apart. Each combustion chamber structure 28 includes a front wall 29, a forwardly sloping back wall 30, a top wall 31 and opposed sidewalls 32, together defining a combustion space or recess 33 which is to constitute the rear section of a composite expansion chamber. Each combustion chamber structure 28 may be in the form of a casing having its top wall 31 jacketed to provide a cooling chamber 34 for flow therethrough of cooling liquid supplied by a feed duct 35 and carried away by a drain duct 36. The open face of the combustion chamber recess 33 is suitably located over a rectangular opening in the stator cylindrical wall 21, with this opening defined by opposed and transversely-spaced side edges 37, a transverse front edge 38 and a transverse back edge 39, as will be best understood from FIGS. 3 and 7.

Each combustion chamber structure 28 preferably has its forwardly sloping back wall 30 equipped with suitable fuel firing means, such as a spark plug 40 threadably mounted in an internally-threaded hole therein. A supply tube 41 preferably leads through the jacketed top wall 31 and its cooling chamber 34 to feed a pressurized fuel mixture or charge to the combustion chamber recess 33 from any suitable source by way of a conventional, operatively-timed and flow-controlling valve (not shown). The fuel charge supplied to each combustion chamber recess 33 will be carbureted externally of the engine to include the required amount of air to support combustion and the combustible petroleum composition; with the fuel mixture being suitably pressurized to an elevated pressure, such as by pumping equipment well-known in the art. The ignition means or spark plug 40 is supplied with suitable electrical energy in proper timed relation from suitable timing equipment (not shown) which may be of conventional design or of a form in which relative positions of the rotor and stator affect the timing.

As will be seen from FIGS. 2, 3, 4, 7 and 9 to 11 incl. the relatively large open face of each combustion chamber recess 33, defined by the opposed side edges 37, the transverse front edge 38 and the transverse back edge 39, is normally closed by a valve plate 42 having opposed side edges 43, a transverse front edge or nose structure 44 and a transverse back edge 45. The transverse back edge 45 of the valve plate 42 is suitably pivotally mounted to the back edge 39 of the rectangular open face of the combustion chamber recess 33, such as by transverse pivot pin 46 having its ends supported by marginal zones of the stator transverse enclosing cylindrical wall 21. As is shown in FIG. 7, the stator valve plate 42 preferably is biased to its retracted closing position by a light torsion spring 47 mounted about the pivot pin 46.

Figure 10:
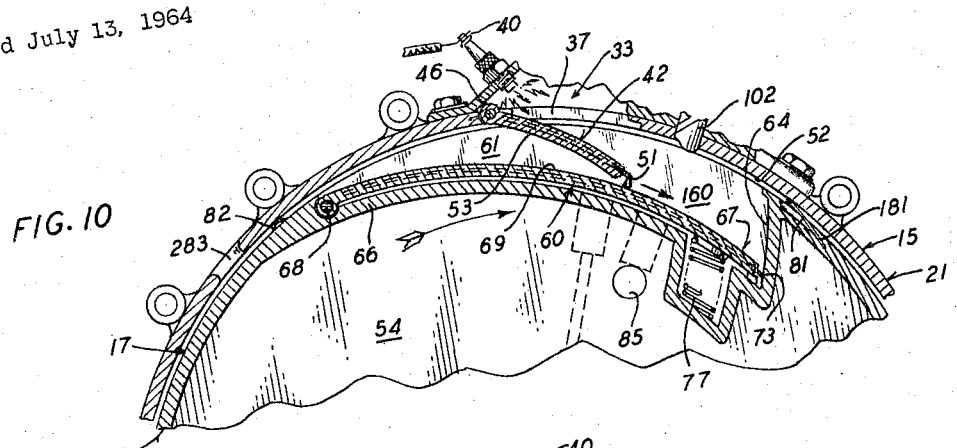
FIG. 10 is a sectional view similar to FIG. 3, showing the relative positions of parts after a fuel charge has been fired to effect the pocket and combustion chamber communication illustrated in FIG. 3 and at a time subsequent thereto when approximately one-third of the expansion has been accomplished with forward drive of the rotor toward the exhaust position.
Figure 11:
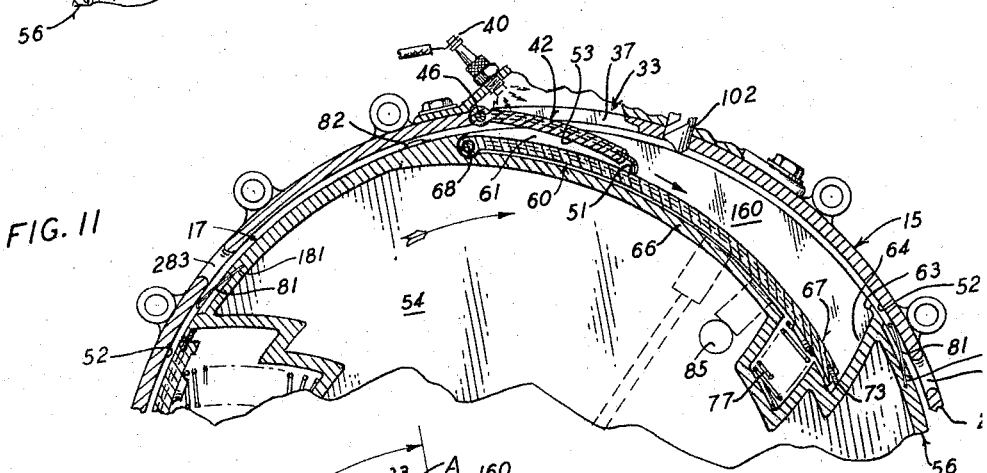
FIG. 11 is a view similar to FIG. 10, showing the relative positions of parts when substantially full expansion has been accomplished and just prior to exhaustion of spent gases from the rotor expansion chamber section.

The hinge structure at the pivot pin 46 is to be of a nature so as to prevent undue leakage between the back edge 45 of valve plate 42 and the opposed back edge 39 of the open face of the combustion chamber recess 33 in the closing position depicted in FIG. 7 and all positions of swing of this valve plate, such as those illustrated in FIGS. 3, 10 and 11. In order to minimize or prevent leakage between the opposed forward edge 39 of the opening in the stator cylindrical wall 21 and the front edge or nose structure 44 of the valve plate 42, and the opposed opening and valve plate side edges 37 and 43, this valve plate may be equipped with suitable gasket means. For this purpose the nose structure 44 and the side edges 43 of the valve plate 42 may be provided with medial slots or channels extending therealong. The gasket means may be provided in the form of a U-shaped blade of spring steel or other metallic composition adapted to withstand the high temperature encountered in the operation of such an engine, which has a front transverse blade section 48 and transversely-spaced side legs 49 slidably seated in these slots or channels. The transverse or nose blade section 48 and the transversely-spaced leg blade sections 49 may be backed in the slots or channels by suitable biasing means, such as sinusoidal strips of spring steel, similar to that illustrated in FIG. 8 with respect to other wiping blade structure associated with a rotor plate valve, described hereinafter. Preferably the forward edge 38 of the face opening in the stator cylindrical wall 21 is undercut or rabbeted, as is indicated at 50 in FIGS. 7 and 9, and the nose or transverse blade section 48 preferably is provided with a downwardly-turned lip 51, so as snugly to seat this shaped transverse front end of the gasket blade structure into the rabbet 50 for a fluid-tight seal thereagainst in the retracted closing position of the stator valve plate 42. The down-turned lip 51 of the stator valve plate 42 preferably has its front edge rounded, as is shown in FIG. 9, so as to serve as a wiper against the top surface of the rotor valve plate, as is explained hereinafter, and this lip is designed to extend inward sufficiently to wipe against the outer cylindrical surface of the rotor intermediate expansion pockets in the latter in the outer retracted position of this stator valve plate, as is later described for the purpose there indicated. The inner face 53 of the stator valve plate 42 is preferably concaved so that it lies along the circle on which the inner surface of the stator cylindrical wall 21 is described.

As will be seen from FIGS. 2, 3, 4 and 8, the rotor structure 17 may be provided as a casting which includes a central web 54 having a medial hub 55 mounted upon power delivery shaft 26, and an annular rim 56 which defines a cylindrical edge surface 57 of the rotor. For efficiency in operation and in order to minimize leakage the diameter of the cylindrical rotor rim surface 57 should closely approach the diameter of the opposed inner cylindrical surface 52 of the stator wall 21. The embodiment of the engine illustrated in FIGS. 1 to 4 incl. is designed for simultaneous firing of the fuel charges in the plurality of combustion chamber recesses 33. Consequently, the rotor structure 17 has its periphery or the cylindrical surface 57 of its rim 56 provided with a plurality of circumferentially-extending pockets 60. For simultaneous firing in the three combustion chamber recesses 33 the rotor structure 17 is provided with at least three such pockets 60, but may, if desired, have a greater number which is a multiple of three, all equally spaced circumferentially of the rotor structure. It is to be understood that the stator structure 15 may be provided with a single combustion chamber structure 28 and the rotor structure 17 may be provided with a plurality of pockets 60 for successive firing of the former thereinto, or with a single such pocket for cooperative operation therewith on each rotor revolution, flywheel effect being depended upon to continue rotation of the rotor structure, after a single firing, around to cooperative location of the rotor pocket relative to the combustion chamber recess for a recycling operation. However, in a practical embodiment of the invention it is desirable that the stator structure 15 be provided with a plurality of the combustion chamber structures 28, located at equally-spaced points, and that the rotor structure 17 be likewise provided with a plurality of the pockets 60, located at equally-spaced points, so that there will be opposition of forces in simultaneous firing to reduce undue strain on engine parts and in order to minimize vibration. Consequently, the embodiment of FIGS. 1 to 4 incl. is provided, for illustrative purposes, with the three combustion chamber structures 28 located 120° apart about the stator cylindrical wall 21, and the rotor structure 17 is provided with three of the pockets 60 also located 120° apart about the rotor rim 56.

Each rotor pocket 60 has a curved open face in the rotor cylindrical edge surface 57 with opposed sides thereof defined by opposed sidewalls 61 which are spaced axially of the rotor structure at least the width of the stator valve plate 42 inclusive of its side wiping blades 49, to permit this valve plate to pivot inwardly therebetween when in proper alignment. As will be understood from FIG. 8 the opposed sidewalls 61 of each pocket 60 are located transversely inward of the outside edges of the rotor rim 56 to define intervening marginal zones 62 of the rotor rim surface 57. The curved open face of each pocket 60 is defined at its leading end by a transverse edge 63 which may be the terminal edge of a transverse, generally radially-extending, leading impaction face 64, or an overhanging transverse lip thereat useful in effecting a suitable seal, as will be explained hereinafter. The open face of each pocket 60 terminates in a trailing transverse edge 65 between which and the inward edge of the impaction face 64 extends a pocket-closing, inner or bottom wall 66.

The rectangular open face of each pocket 60 is normally closed by a second valve plate 67 which is pivotally mounted to the rotor structure 17 on a transverse axis at the trailing transverse edge 65, such as by a transverse pivot pin 68, so as to permit this rotor valve plate to swing inwardly from its outer closing position into the pocket to a retracted position, as is illustrated in FIG. 3. Since the outer face 69 of the rotor valve plate 67 in its outer closing position, illustrated in FIG. 8, is to be rotated in closely opposed relation to the inner cylindrical face 52 of the stator enclosing cylindrical wall 21 it is convexed to lie substantially in alignment with the arcuate cylindrical face 57 of the rotor rim 56. The inner face 70 of rotor valve plate 67 preferably is concaved to be juxtaposed closely to the convexed bottom wall 66 so as to minimize the intervening space for permitting the rotor valve plate effectively to serve as a pumping element in the rotor pocket 60. As is indicated in FIG. 8, opposite side edges 71 and the transverse leading edge 72 of the rotor valve plate 67 are snugly gasketed respectively to the opposed pocket sidewalls 61 and the transverse impaction face 64. Accordingly, this impaction face 64 while extending generally radially-inward is arranged along an arc of a circle struck about the axis of the pivot pin 68. Gasket means are provided for the rotor valve plate 67 in any suitable form, such as by means of a U-shaped spring steel blade structure having a transverse wiper section 73 and a pair of transversely-spaced leg wiper sections 74, with the back edge of the former seated in a transverse channel in the valve plate nose 72 and with the inside edges of the leg sections 74 seated in longitudinally-extending channels 75 in the opposite edges 71 of this valve plate, as will be understood from FIG. 8. Since the front edge of the transverse wiper section 73 and the outside edges of the leg wiper sections 74 are to slide with substantially fluid-tight contact respectively against the impaction face 64 and the opposed side faces 61 of the pocket 60, it is preferable that biasing means be mounted behind these wiper sections within the channels 75. Such biasing means may be in the form of sinusoidal strips of spring steel, a portion of one of which is indicated at 76 in FIG. 8, and which is similar to biasing means which may be employed in the edge channels of the stator valve plate 42 for like purpose with respect to the wiper blade sections 48 and 49 thereof.

The transverse overhanging lip 63 at the outer end of the impaction face 64 of each pocket 60 may provide a suitable stop against the inner face of which seats wiper blade section 73 in the outer closing position of the rotor valve plate 67, as will be understood from FIG. 8. Rotor valve plate 67 is biased outwardly to its pocket closing position, illustrated in FIGS. 2 and 8, by suitable urging means, such as a helical compression spring 77 having its top or outer end engaged over a boss 78 carried by the inner concave surface 70 of the rotor valve plate 67, and its bottom or inner end seated within a cup-shaped recess 80 defined in the pocket bottom wall 66 by a hollow boss 79.

To reduce undue leakage between the rotor and stator structures during expansion of the burning fuel charge in each expansion chamber behind its impaction face 64 the leading end of each pocket 60 is provided, preferably near lip 63, with a transverse intervening wiper 81, described in detail hereinafter. A scavenging cam lobe 82 preferably is provided in a marginal zone 62 of the rotor rim face 57 for each combustion chamber structure 28 for a purpose explained later.

With the gasketing of the leading nose 72 and the opposite side edges 71 of the rotor valve plate 67 to the leading impaction face 64 and opposed sidewalls 61 of the pocket 60 in which it is pivotally mounted provision is made for venting the triangular space between the pocket bottom wall 66 and the concave inner face 70 of this valve plate. Such venting may be provided in a form whereby it may serve a useful purpose, such as for compressing air to be conducted to suitable exterior storage means from which it may be withdrawn for use in mixing with combustible fuel for supply of carbureted air as a fuel charge under elevated pressure to each combustion chamber, as will be explained later.

In operation of the basic engine structure described above, let it be assumed that the rotor structure 17 is located in the stator chamber 16 in a position approaching in clockwise rotation the firing position illustrated in FIG. 2. A suitable combustible fuel mixture will be supplied to the closed combustion chamber recess 33 through the fuel charge supply duct 41 from suitable carbureting and pressure elevating mechanism which may include a supercharger. At the instant when the parts are in the relative positions illustrated in FIG. 2, with the stator valve plate 42 substantially overlying the leading section of the rotor valve plate 67 and with the leading impaction face 64 of the rotor pocket 60 located just forward of the combustion chamber recess 33, the fuel charge in the latter will be fired through suitable timing equipment and by means of the spark plug 40. The result of such firing of the fuel charge in the combustion chamber recess 33 is shown in FIG. 3. Progressive burning of the fuel charge in the combustion chamber recess 33 instantaneously causes the development of sufficient pressure to overcome the biasing forces of the valve plate springs 47 and 77 (FIGS. 7 and 8), so that the stator valve plate 42 is explosively depressed or swung radially inward into the leading portion of the rotor pocket 60 with retraction of the rotor valve plate. The wiper lip 51 of the nose structure of the stator valve plate 42 engages the convex camming surface 69 of the rotor valve plate 67 to cause the latter to be swung inwardly to its retracted position depicted in FIG. 3. This inward swing of the rotor valve plate 67 is accompanied by wiping engagement of the transverse gasket blade section 73 inward along the impaction face 64, wiping engagement of the longitudinal gasket blade sections 74 inward against the opposed side faces 61 of the rotor pocket 60, and wiping engagement of the longitudinal gasket blade sections 49 inward along the same opposed pocket sidewalls. As a result, a composite expansion chamber 160 is defined between the leading transverse impaction face 64 and the convex top surface of the stator valve plate 42 as well as above the forward portion of the convex top surface 69 of rotor valve plate 67 extending forward beyond the wiping blade 51 contacting it. This composite expansion chamber includes the combustion chamber recess 33. The explosive force impinging upon the transverse impaction face 64 drives the rotor structure 17 forward in the clockwise direction shown in FIG. 3. With progressive burning of the fuel charge in this closed expansion chamber 160 and resulting forward drive of the rotor structure 17 the convex top surface 69 of the rotor valve plate 67 glides forward beneath the wiping lip 51 of the nose structure of the stator valve plate 42 progressively to enlarge the expansion chamber 160, as will be understood from a comparison of FIG. 3 with FIG. 10, the latter representing approximately the conditions of about one-half of the expansive action.

In the forward rotation of the rotor structure 17 the convex top surface 69 of the rotor valve plate 67 glides forward beneath the nose structure of the stator valve plate 42 and its wiping blade 51 to serve as a cam surface for progressively lifting the stator valve plate outward to the closing position in the open face of the combustion chamber recess 33. This will be understood by a comparison of FIG. 10 with FIG. 11 with the latter representing the relative positions of the parts of the stator and rotor structures when approximately full expansion of the burning fuel charge is attained. Flywheel action of the rotor structure 17 continues the forward rotation thereof so that ultimately the rotor pocket 60 and its closing rotor valve plate 67 are carried forward beyond the stator valve plate 42, with the latter swung back outward or retracted to its closing position of the open face of the combustion chamber recess 33, as is illustrated in FIG. 2. As the trailing portion of the convex top surface 69 of the rotor valve plate 67 glides forward from beneath the wiping blade lip 51 of the stator valve plate 42, this lip is gradually raised to engagement of the cylindrical face 57 of the rotor rim 56 for complete lift of the stator valve plate to the closed position of FIG. 4 wherein the transverse wiping blade 48 and its depending lip 51 are snugly engaged against the rabbeted face 50 of the forward edge 38 of the combustion chamber open face (FIGS. 7 and 9). In such closing position, the longitudinally-extending side wiping blades 49 of the stator valve plate 42 are also brought to substantially fluid-tight contact of the opposed side edges 37 of this open face for secure closure of the latter to permit a subsequent pressurized fuel charge to be delivered to the closed combustion chamber recess 33 for recycling.

If desired, a suitable catch may be mounted on the stator structure at the open face of each combustion chamber recess 33 to engage and temporarily to hold the associated stator valve plate 42 in its retracted closing position. Suitably timed tripping mechanism may be driven by the rotor structure 17 to release this stator valve plate 42 when the forward sections of one of the pockets 60 and its closing valve plate 67 are rotated forward to location therebeneath. Such latching means and its trip mechanism may be provided in substitution for the inward projecting tip of lip 51 which extends radially inward to contact rotor rim surface 57 to hold the stator valve plate 42 retracted to its outward closing position between the successive rotor pockets 60.

As the rotor structure 17 is rotated forward from the position depicted in FIG. 11 the leading transverse edge 63 of the pocket 60 is rotated to beyond an exhaust passage 83, to carry therepast transverse wiping blade structure or gasketing means 81 carried by this lip or the rotor rim 56 just forward of this pocket which may assure fluid-tightness with respect to the inner cylindrical surface of the stator cylindrical wall 21, hereinafter more completely described as to structure and function. The spent gases in the expansion chamber 160 will thus pass out of the exhaust passage 83 communicating therewith in such exhaust position of the rotor structure 17. Consequently, the biasing spring 77 is permitted to return or lift the retracted rotor valve plate 67 to its closing position as is depicted on the right side of FIG. 4 for a recycling operation with respect to the succeeding combustion chamber structure 28 of the stator structure.

During the firing which initially explosively depressed the stator valve plate 42 into the rotor pocket 60 to the position depicted in FIG. 3, and the subsequent progressive burning of the fuel charge causing the progressive enlargement of the expansion chamber 160 through the relative positions depicted in FIGS. 10 and 11, there is defined in the forward rotation of the rotor structure 17 behind this stator valve plate, outward of the portion of the rotor valve cam surface 69 which is approaching the stator valve wiping lip 51 and inward of the portion of the stator cylindrical surface 52 opposed to this portion of the cam surface, a substantially triangular space of gradually decreasing volume. The creation of this triangular space by the firing resulting from the consequential depression of the rotor valve plate 67 and the stator valve plate 42 into the rotor pocket 60 may require provision for aspirating relief air thereinto. The following gradual reduction of the volume of this space may then require discharge of the aspirated relief air. This may be readily accomplished through the exhaust passage 283 which is provided for the combustion chamber immediately preceding that illustrated in detail in FIGS. 2, 3, 10 and 11, or other suitable means.

The space within the bottom of the rotor pocket 60 beneath the rotor valve plate 67 also may require discharge of gases or air therein to atmosphere in the explosive depression of this valve plate and aspiration thereinto of relief gases or air when this rotor valve plate is permitted to rise by virtue of its spring biasing to its outer pocket closing position. This may be accomplished by any suitable means which defines a flow passage communicating to the bottom of the pocket 60 with, if desired, the stator chamber 16 suitably communicated to atmosphere, such as by a relief hole 84 in stator sidewall (see FIG. 2). For this purpose the rotor web 54 may be provided with a transverse hole 85 beneath the bottom wall 66 of each pocket 60 communicating with a radial passage 86 leading through the pocket bottom wall 66. It may be desired to employ such air relief passage with a spring-biased check valve 87 to limit flow therethrough to outward aspiration into the bottom of the pocket 60, with further provision for discharge of the aspirated air thereout of. Such a discharge passage may be in the form of a radial bore 88 with flow therethrough limited to the inward direction by a spring-biased check valve 89 (FIGS. 2–4). The discharge bore 88 may desirably lead inward to communication with the axial bore 27 of the power delivery shaft 26 in turn suitably communicated to storage equipment. Thus, when the rotor valve plate 67 is in its outward pocket closing positions shown in FIG. 2, aspirated air between it and the bottom wall 66 of the pocket 60 will be driven out past check valve 89 and through discharge passage 88 upon explosive depression of this rotor valve plate into the bottom of the pocket, to be delivered by the shaft bore 27 to the storage equipment.

The rotor valve plate 67 of each rotor pocket 60 thus serves as a pumping element which forces air under compression from the pocket bottom space through the delivery passage 88 as this valve plate is swung inwardly thereinto to its retracted position from its outer pocket closing position and, as such, aspirates air into this pocket bottom space as it is permitted to be swung outwardly by its biasing spring 77 from its inward retracted position up to its pocket closing position. Of course, when the delivery of compressed air is to be effected through one of the hollow power supply shaft 26 of the engine by means of a suitable rotary joint, the other end of the shaft bore 27 will be suitably plugged. The compressed air which is so collected in storage equipment or a tank thereof may then be employed for admixture with combustible fuel by any suitable carbureting equipment to provide the pressurized fuel charge supplied to each combustion chamber recess 33 through the supply duct 41 thereof, and if a higher pressure is desired suitable supercharging equipment may be employed in supplement thereto.

Minor leakage between the rotor and stator and parts thereof may be appreciably reduced, if this is desired, in various ways. In order to gasket the cylindrical marginal zones 62 of the outer surface 57 of the cylindrical rotor rim 56, flanking both sides of the one or more of the pockets 60 in this rim surface, inwardly-biased ring gaskets may be carried by the opposed sidewalls 19 and 20 of the stator structure 15 which will have continuous wiping contact with the side edges of the cylindrical rotor rim. Alternatively, outwardly-biased gasketing ring structures may be carried by these cylindrical marginal zones 62 of the rotor rim surface 57 which will have continuous wiping contact with opposed marginal zones of the inner surface 52 of the enclosing transverse cylindrical stator wall 21. The function of the latter may be provided by gasket rings carried by the inner face 52 of the stator wall 21 with inner edges thereof wiping against surfaces of the rotor rim 56, hereinafter illustrated and described. In the latter case the cylindrical rim surface 57 of the rotor rim 56 may be equipped with transversely-extending, outwardly-biased and radially-extending wiping blade 81 for each rotor pocket 60 mounted substantially at or a short distance ahead of the transverse leading end 63 of this pocket, snugly between the circular gasket rings carried by the marginal zones 62 of this cylindrical rim surface, and with its outer edge in continuous wiping contact with areas of the inner surface 52 of the stator cylindrical wall 21. If the exhaust passage 83, or 183, or 283 trailing this pocket 60, when the latter is radially aligned with one of the combustion chamber recesses 33 in the firing position, is to serve as a vent or breather passage for the triangular space behind the stator valve plate 42 thereof when explosively depressed into the pocket no like transverse wiping blade will be mounted on the rotor rim 56 between such exhaust passage and the trailing end at 65 of this pocket. The outer edge of each such rotor wiping blade 81 would also wipe along the inward concave surface 53 of each stator valve plate 42 while maintaining wiping contact with the marginal zones of the inner surface 52 of the stator cylindrical wall 21 flanking the face of each combustion chamber recess 33.

Each transverse wiping blade 81 may be in the form of a strip of spring metal, such as suitable steel composition, mounted to the rotor rim 56 to extend obliquely backward and outward for wipe of its trailing lip against the inner cylindrical face of the stator circular closing wall 21 and the concaved inward face of each stator valve plate 42 as it is dragged forward along the latter. The mount of each rotor wiping blade 81 may be conveniently provided by forming in the rotor rim 56 at the location for each such wiping blade an oblique slot 181 into which the butt edge of this blade is press fitted (see FIGS. 2 to 4 incl., 9 to 11 incl., and more particularly 14, 14A and 15).

When such transverse wiping blades 81 are mounted on the cylindrical rim surface 57 of the rotor 17 ahead of each pocket 60 provision should be made to avoid interference thereof with the operating cam followers of any scavenging valves, if employed, such as of a type hereinafter described. This can be readily attained by mounting the trip cam for each scavenging valve on one of the marginal zones 62 of the cylindrical rotor rim surface 57 and axially outward of the nearest of the pair of circular gasket rings to be carried by this rotor rim surface, such as at 82 indicated in FIGS. 5, 6 and 8, trailing the pivoted back end at 65 of each rotor valve plate 67. If it is undesirable to have such a trip cam constitute a projection on the rotor cylindrical rim surface 57 it may be provided as the curved face of a localized recess or notch therein with each scavenging valve operating follower spring-biased inwardly to ride on the marginal zone 62 of the cylindrical rotor rim surface 57 until it drops momentarily into and then rides out of such recess or notch. Alternatively, a side edge of the rotor rim 56 may carry a trip cam surface with the scavenging valve operating mechanism including a spring-biased cam follower plunger mounted on and extending through the adjacent stator sidewall 19 or 20.

After full expansion of the fired combustible fuel charge in the expansion chamber 160 (which includes as a section thereof a combustion chamber recess 33 and also the interconnecting sidewall provided by the lapped valve plates 42 and 67), the stator valve plate 42 is retracted outwardly to the combustion chamber recess closing position of FIG. 4 as the expansion chamber section defined in the pocket 60 above the rotor plate valve 67 is carried around to the exhaust position for venting of the spent gases through the exhaust passage 83, as is explained above. As a consequence, a small quantity of the spent gases may be trapped in the reclosed combustion chamber recess 33. Despite this fact the engine will operate satisfactorily since the relatively low degree of dilution of the pressurized fuel charge fed to the closed combustion chamber recess 33 by the spent gases trapped therein will not prevent effective firing of this fuel charge mixture. However, greater efficiency may be attained by providing means for scavenging such spent gases from each previously-fired, closed combustion chamber recess 33 as a fresh pressurized fuel charge is fed thereto. Such a scavenging valve structure may take the form of that proposed at 93 in FIGS. 2 to 6 incl. As is therein indicated the forward wall 29 of each combustion chamber recess 33 may be apertured to provide an annular valve seat 90 circumscribed about the mouth of a counterbore 91 communicated to atmosphere by passage 92.

Each scavenging valve and operating mechanism 93 may include a casing 94 provided as an integral section of the casting which provides each jacketed combustion chamber unit 28 (details of which are best seen in FIGS. 5 and 6). The casting section casing 94 has its counterbore chamber 91 arranged coaxially with a through bore 95 which reciprocatively receives therethrough a valve stem 96 carrying on its inner end a valve head 97 spring-biased or urged to the valve seat 90 by means of a helical compression spring 98 housed in a counterbored socket 99. The valve stem bore 95 is traversed by a radial plunger bore 100 aligned with a hole 101 extending through the stator cylindrical wall 21 for communication to the stator chamber 16. A piston or plunger cam follower 102 is reciprocatively mounted in the aligned bore 100 and hole 101, and is suitably urged radially inward by a biasing compression spring 103 mounted in the bore 100 above the top end of this cam follower plunger. An oval slot 104 extends transversely through the cam follower plunger 102 for extension therethrough of the valve stem 96, with the oval shape of this slot permitting limited longitudinal reciprocation of the plunger relative to the valve stem. An oblique slot 105 is cut into the side of the cam follower plunger 102 to communicate with the oval transverse slot 104 to define a sloping cam surface facing forward toward the valve seat 90. The extending ends of a transverse pin 106 carried by the valve stem 96 in the slot 105 serve as cam followers riding upon the oblique cam face of this slot. The bottom end of the cam follower plunger 102 is provided with a depending nose 107 designed to ride up over each trip cam lobe 82 carried by the forwardly rotating rotor rim 56.

In operation of the scavenging valve structure 93, as a trip cam lobe 82 on the rotor rim 56 is rotated forward beneath the nose 107 of the cam follower plunger 102 the latter is lifted against the biasing force of its urging spring 103. This causes the oblique cam face of side slot 105 to ride upwardly behind the extending ends of the transverse pin 106 and thrust the valve stem 96 backward against the biasing force of spring 98, to move the valve head 97 back away from the valve seat 90, thereby communicating combustion chamber recess 33 with the vent hole 92 via the chamber 91. Thus, when each trip cam lobe 82 is properly placed in the marginal zone 62 of the rotor rim cylndrical surface 57 this scavenging valve will be caused to open after the stator valve plate 42 has reclosed the open face of the combustion chamber recess 33 with entrapment of spent gases therein, so as to vent these spent gases out through the venting hole to the atmosphere immediately before a fresh pressurized fuel charge is fed to the closed combustion chamber. As the trip cam lobe 82 passes forward from beneath the nose 107 of the cam follower plunger 102 the biasing spring 103 thrusts this plunger downward or inward to cause the oblique cam face of side slot 105 to back away from the extending follower ends of the transverse pin 106. Consequently, the biasing spring 98 retracts the valve stem 96 to draw the valve head 97 against the valve seat 90, so as to close communication between the combustion chamber recess 33 and the vent hole 92. Thus, after scavenging of the spent gases from the closed combustion chamber recess 33 it is readied for recycling operation with the supply of a pressurized fuel charge thereto. Scavenging of each fired combustion chamber recess can also be accomplished by using timing mechanism which feeds a pressurized fuel charge thereto while an oncoming rotor pocket is approaching radial alignment therewith and upon attainment of the alignment fires the charge, but which then with respect to the next oncoming pocket does not effect the firing of a charge in this combustion chamber recess. In the latter event scavenging air could be fed to the combustion chamber recess to cause its stator valve plate to depress the rotor valve plate of this succeeding aligned rotor pocket to flush out any remaining spent gases, and then the timing equipment would repeat the operation of supply of a full charge and firing thereof.

Figure 12:
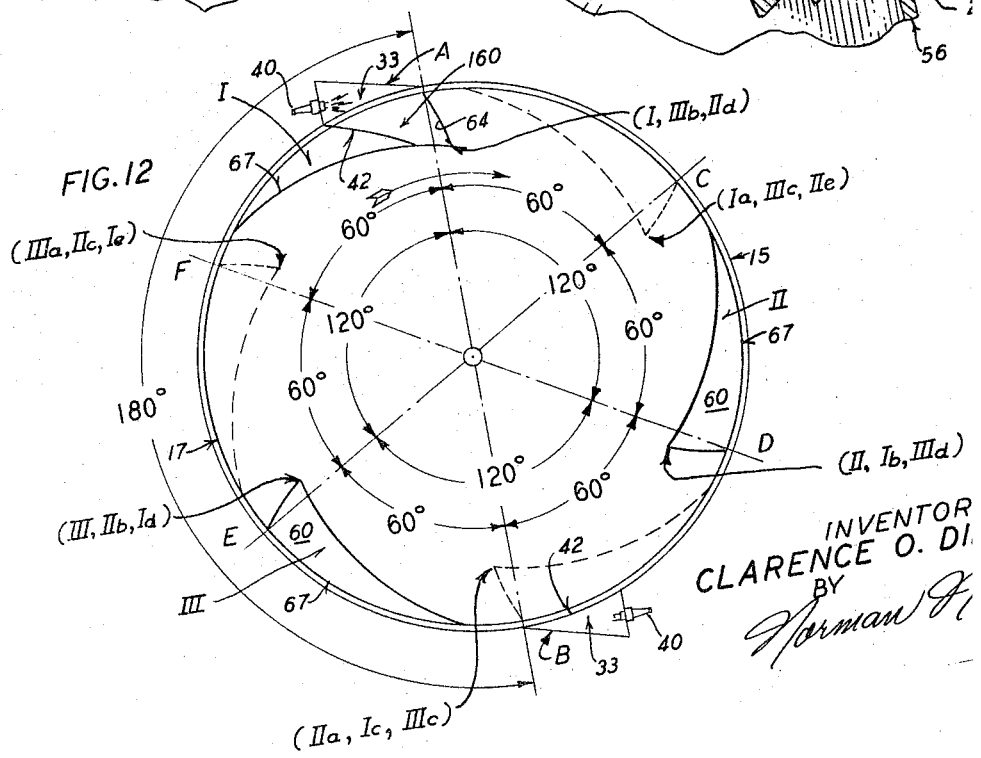
FIG. 12 is a diagrammatic view of relative positions of a pair of stator combustion chambers, three rotor pockets and their closing valve structures during one complete rotation of the rotor within the stator, illustrating serial firing in which fuel charges are alternately fired in the combustion chambers.

An embodiment of the engine of the present invention may be provided which will have serial firing if the stator structure is equipped with an even number of the combustion chamber units, each of which embodies a combustion chamber recess with these units mounted on the enclosing cylindrical wall of the stator at point equally spaced circumferentially thereof, and if the rotor is provided with an odd number of the pocket structures equally spaced circumferentially thereof. In FIG. 12 is shown diagrammatically such a relationship of a serial firing engine and the firing program thereof. As is therein indicated the stator structure 15 is equipped with two combustion chamber recesses 33 located at A and B diametrically across from each other 180° apart. The rotor structure 17 is provided with three of the pockets 60 indicated at I, II and III arranged 120° apart, with the pocket I positioned in suitable radial alignment with the combustion chamber recess 33 at location A at the instant of firing. The resulting drive of the rotor carries the pocket I forward 60° to location C to occupy position Ia, which moves pocket II from location D to position IIa in radial alignment with the combustion chamber recess 33 at location B, and pocket III from location E to position IIIa at F. Then the combustion chamber recess 33 at location B, fires into pocket II in its IIa position to drive the rotor further forward through 60°. This places pocket III at position IIIb for firing of the combustion chamber recess at location A thereinto, with pocket I at position Ib in location D and pocket II at position IIb in location E. The consequent firing of the combustion chamber recess 33 at location A into pocket III again advances the rotor 60° to position pocket I at Ic for firing the combustion chamber recess 33 at location B thereinto with pocket II positioned at IIc in location F and pocket III positioned at IIIc in location C. The firing of the combustion chamber recess 33 at location B into pocket I again advances the rotor 60° to move pocket I to position Id at location E, pocket II to position IId for radial alignment with combustion chamber recess 33 at location A, and pocket III to position IIId at location D. Resulting firing of the combustion chamber recess 33 at location A into pocket II further advances the rotor 60° to carry pocket II to position IIe at location C, pocket III to positon IIIe for radial alignment with the combustion chamber recess 33 at location B and pocket I to position Ie at location F. The firing of the combustion chamber recess 33 at location B into pocket III again advances the rotor 60° to locate the three rotor pockets in the full line positions shown in FIG. 12 for a repeat of this cycle. It will thus be seen that in one revolution of the rotor six evenly timed serial firings are obtained. One can readily determine the progressive pattern of serial firing of an engine equipped with more of an even number of the stator combustion chambers and the same or more of an odd number of the rotor pocket structures from this explanation of the diagrammatic showing in FIG. 12.

In FIGS. 13 to 16 incl. are illustrated the employment of annular gasket sealing ring means intervening the cylindrical rotor rim 56 and the stator cylindrical closing wall 21, in association with transverse wiping blade means 81. As will be understood therefrom, as well as from the showings in FIGS. 7 and 8 that annular channels 108 are provided in marginal zones of the inner cylindrical face 52 of the stator closing sidewall 21 with each having seated therein the outer circular edge of one of a pair of flat washer-like gasketing rings 109 of suitable wear resisting metallic compositon having a high melting point. It will be understood from FIGS. 7, 8, 13 and 16 that each of the annular channels 108 breaks out into a rabbet in one of the side edges 37 of the open face of each combustion chamber recess 33, so that the inboard side face of each of these gasketing rings 109 lies in the same plane as the adjacent unrabbeted portion of the side edge 37 of the chamber recess open face. This will permit the side legs 49 of the gasketing blade structure carried by the stator valve plate 42 to ride smoothly therealong when swung inwardly by combustion firing in the recess 33 to swing the rotor valve plate 67 into the rotor pocket 60 when these valve plates are in the relatively aligned positions of FIG. 10, as will be understood from FIG. 13. The inner edge of each of the gasketing rings 109 is adapted to ride in one of a pair of rotor rim channels 110 which flanks one of the marginal zones 62 of the arcuate rotor rim surface 57. It will be seen from FIGS. 8 and 13 that the rotor rim channels 110 break out into rabbets in the inner side faces 61 of each expansion chamber pocket 60, so that the side legs 74 of the gasketing blade structure carried by the rotor valve plate 67 may ride in the flat vertical planes defined also by the inner side faces of the gasketing rings 109. It will be noted from FIG. 13 that with the inner side faces of the gasketing rings 109 aligned with the inner faces 61 of the sidewalls of the expansion chamber pocket 60, such gasketing blade legs 74 may ride smoothly across from one to the other for maintenance of substantially gas tight seals.

Such gas-tight seals provided by the annular gasketing rings 109 may be improved by the provision of an additional pair of gasketing rings 111 of less outside diameter than the inner diameter of the stator closing wall 21, having their inside edges seated in channels 112 in the rotor rim 56, so that their inside faces will ride smoothly against the outside faces of the gasketing rings 109. Such cooperative gasketing ring structure not only provides a tortuous path for any flow between channel surfaces and lapped gasketing ring surfaces, but also permits the flanking gasketing rings 111, when made of suitable wear resisting metallic material having a high melting point, to serve as bearing surfaces for the outboard faces of the annular gasketing rings 109. It will also be understood from the preceding description and the showings in the drawings, more particularly FIG. 13, that in all positions of the stator valve plate 42 and rotor valve plate 67 between the retracted positions thereof depicted in FIG. 13 and downward swing thereof as is effected by firing of fuel in the combustion recess 33, when the latter is located above a rotor pocket 60, that the side wiping blade legs 49 and 74 of these respective valve plates will always have their outer edges snugly abutted against opposed flat surface structures of aligned parts. These opposed flat surface structures on each side are the unrabbeted edge face 37 of the open face of combustion recess 33, the inside face of annular gasketing ring 109 and the rabbeted inside face 61 of the rotor pocket 60.

It will be seen from FIG. 15 that the side edges of each transverse wiping blade 81 carried by the rotor rim 56 immediately ahead of each expansion pocket 60 snugly wipe against the inner faces of the transversely-spaced annular gasketing rings 109, so as to eliminate any undue leakage thereat. With the trailing nose of each spring leaf wiping blade 81 dragging against the cylindrical inner face 52 of the stator arcuate closing wall 21 and successively the concaved inner face 53 of each stator valve plate 42, except when it is wiped beneath the depending lip 51 of this valve plate, flow of combustion gases from the expansion pocket 160 is effectively blocked by such wiping blade until the latter has advanced forward to beyond the next preceding exhaust passage 83, as may be understood from FIG. 11.

Since the side legs 49 of the U-shaped gasketing wiper structure carried by the forward end of each stator valve plate 42 are to have their longitudinally-extending outside edges in snug wiping engagement with the inner side edges 37 or the inside faces of the annular gasketing rings 109 rabbeted thereinto, as well as the inside faces of the sidewalls 61 of the expansion pocket 60, by virtue of the spring biasing of these side legs effected by the backing sinusoidal spring strip 76, it is preferable that the transverse forward section 48 and its depending lip 51 be in the form of an assembly of parts permitting transverse expansion without undue leakage. This may be accomplished by separating the transverse section 48 and its depending lip 51 into a pair of sectional parts which may have at the mid-joint lapping surfaces or projections extending transversely from the parts toward each other for lap of those on one side against those on the other side across the mid-joint provided with abutted transverse wiping surfaces to avoid undue leakage at such joint while permitting relative transverse sliding action. Or, as is proposed in FIG. 16, the two sectional parts of the depending nose structure 51 may be provided at the mid-joint with transversely aligned channels 113 in which is slidably mounted a blocking strip 114. Undue leakage through the mid-joint extending across the transverse section 48 of this wiping blade structure may be effectively blocked by similar sliding blocking strip means or the blocking strip 114 may have its top edge provided with a rearwardly extending flange lapped under the half portions of transverse section 48 after projecting rearwardly through lateral slots leading laterally back away from the top edges of channels 113. Leakage at this mid-joint may also be reduced to an acceptable degree by extending the portion of the nose 44 of the stator valve plate forward to define an underlapping nose 144 which extends forward to beneath the overhanging lip 38 of the stator cylindrical closing sidewall 21 as this transverse wiping blade structure is seated up into the transverse rabbet 50 in the retracted position of the stator valve plate 42, as may be best understood from FIG. 9.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A rotary compression combustion engine comprising, in combination with
 (a) a stator casing having opposed spaced sidewalls and an intervening enclosing transverse cylindrical wall defining together therein a cylindrical housing chamber, and a cylindrical rotor coaxially mounted upon a drive shaft rotatably supported by said opposed sidewalls and extending through at least one of the latter to the exterior of said housing chamber with said rotor having a cylindrical edge surface to be driven in one certain direction and juxtaposed closely to said stator enclosing cylindrical wall; of (b) means fixedly mounted upon said stator enclosing cylindrical wall defining at least one combustion chamber radially outward of said housing chamber with said combustion chamber having a relatively large open face defined by an opening in said cylindrical wall, said open face having a forward transverse edge and opposed transversely-spaced side edges;

(c) a valve plate having a transverse back edge pivotally mounted to said stator on a transverse axis to the rear side of the combustion chamber open face with respect to the direction of rotation of said rotor and normally closing said open face in an outward retracted position, transversely-spaced side edges, and a forward transverse edge structure constituting a nose structure adapted to be swung inward into said housing chamber to an open position upon firing of fuel mixture in said combustion chamber for communicating the combustion chamber to said housing chamber;

(d) means defining in the cylindrical edge surface of said rotor a circumferentially-extending pocket having opposed sidewalls axially spaced at least the width of said stator valve plate, a generally radially-extending leading transverse impaction face, a curved open face at the edge surface of the rotor and a trailing transverse edge in the vicinity of the rotor cylindrical edge surface;

(e) a second valve plate having a trailing transverse edge pivotally mounted to said rotor on a transverse axis at the trailing transverse edge of the pocket and normally closing the open face of the pocket in a radially outer position, transversely-spaced side edges, and a transverse leading edge adapted to be swung inwardly into the pocket to define the bottom of an expansion chamber tapering back gradually from said impaction face toward the pivot axis of said rotor plate valve;

(f) means for supplying a pressurized combustible fuel mixture to said combustion chamber;

(g) means to fire the pressurized combustible fuel mixture in said combustion chamber at a time when said rotor is in a firing position relative to said stator at which said stator valve plate substantially overlies the leading section of said rotor valve plate with said impaction face located forward of said combustion chamber to cause said stator valve plate to swing radially inward under the influence of the pressure in said combustion chamber of expanding combustion gases into the leading portion of said rotor pocket with retraction of said rotor valve plate into the bottom of the latter which converts it into an expansion chamber so as to permit expanding combustion gases to rush out of the opened combustion chamber circumferentially forward into the open expansion chamber for rotor-driving impaction against the leading transverse face of the latter;

(h) means to swing said rotor valve plate radially outward thereafter at a forward exhaust position of said rotated rotor to its pocket closing position with swing thereby of said stator valve plate to its chamber closing position, for recycling; and (i) means to exhaust combustion gases from said expansion chamber as said rotor valve plate is swung outward to its pocket closing position.

2. The rotary compression combustion engine as defined in claim 1 in which gasket means are mounted on the leading transverse edge and the opposite side edges of said rotor valve plate for gasketing these edges respectively to form substantially gas-tight wiping action against said impaction face and the faces of said opposed pocket sidewalls, and other gasket means are embodied in the transverse nose structure and carried by the opposite side edges of said stator valve plate for gasketing the nose and side edges respectively to the forward transverse edge and opposed side edges of the open face of said combustion chamber.

3. The rotary compression combustion engine as defined in claim 2 in which said means to exhaust combustion gases defines an exhaust passage out through said stator at a point forward of said combustion chamber communicable with said expansion chamber in the exhaust position of said rotor as the valve plate of the latter travels forward beyond said combustion chamber, and spring means located in said pocket biasing said rotor valve plate outwardly toward its pocket closing position for lift thereof to this position as combustion gases in said expansion chamber are exhausted through said exhaust passage.

4. The rotary compression combustion engine as defined in claim 3 in which the top face of said rotor valve plate is convex to lie in its pocket closing position substantially along an arc of the cylindrical edge surface of said rotor, said top convex face of said rotor valve plate in its inward retracted position in said pocket providing a wiping cam surface which in forward rotation of said rotor will glide forward beneath the nose structure of said stator valve plate when the latter is in its inward open position, inward radial swing of said stator valve plate to its inward open position under the influence of the pressure of the expanding combustion gases in said combustion chamber causing the nose structure of said stator valve plate to engage said top camming surface of said rotor valve plate and retract the latter against its spring biasing to its retracted position in said pocket and to assist in holding it there during attendant expansion of the combustion gases in the resulting combustion chamber until exhaustion therefrom through said exhaust passage, said cam surface sloping upwardly back to the pivot axis of said inwardly retracted rotor valve plate gradually to retract said stator valve plate outwardly to its closing position by relative wipe of the nose structure of the latter back along said cam surface as said rotor valve plate is carried forward by said rotor.

5. The rotary compression combustion engine as defined in claim 4 in which said stator valve plate nose structure makes transverse substantially fluid-tight wiping contact with said cam surface of said rotor valve plate in all positions of relative engagement, with said gasket means carried by the side edges of said stator valve plate making substantially fluid-tight wiping contact with the opposed faces of said pocket sidewalls while stator valve plate is explosively depressed in said pocket thereby defining in the forward rotation of said rotor behind said stator valve plate, outward of the portion of said rotor valve cam surface which is approaching said stator valve wiping nose structure and inward of the portion of the stator cylindrical wall opposed to this portion of the cam surface a substantially triangular space of gradually changing capacity vented to the atmosphere, and means venting the space in the bottom of said rotor pocket beneath said rotor valve plate which is pivotally mounted therein.

6. The rotary compression combustion engine as defined in claim 5 in which said venting means for the pocket bottom space defines an inlet passage leading thereto from atmosphere, check valve means in said inlet passage to limit flow therein toward the pocket bottom space, a delivery passage leading from the pocket bottom space, and check valve means in said delivery passage to limit flow therein outward from the pocket bottom space, said rotor valve plate which is pivotally mounted in said pocket constituting a pumping element which forces air under compression from the pocket bottom space through the delivery passage as the rotor valve plate is swung inwardly thereinto from its pocket closing position to its retracted position and aspirates air into the pocket bottom space when said rotor valve plate is swung outwardly from its inward retracted position out to its pocket closing position.

7. The rotary compression engine as defined in claim 1 in which a plurality of said combustion chambers are mounted on said stator enclosing cylindrical wall at points equally spaced circumferentially thereof with the rotor pocket structure being adapted successively to operate cooperatively with said combustion chambers.

8. The rotary compression combustion engine as defined in claim 1 in which are provided on said stator means to define a scavenging passage leading from said combustion chamber to atmosphere, valve means urged to a position of closure of the scavenging passage, and means operated by said rotor to open said scavenging passage valve means at a time of closure of said combustion chamber following the firing of a fuel charge therein and while a following fuel charge is supplied thereto for subsequent firing.

9. The rotary compression combustion engine as defined in claim 8 in which a biasing spring urges said scavenging valve means to its closing position, cam follower means retracts said scavenging valve to open position, and trip cam means carried by said rotor operates said cam follower means.

References Cited by the Examiner
UNITED STATES PATENTS

| | | | |
|---|---|---|---|
| 1,153,169 | 9/1915 | Miller | 123—15 |
| 1,225,056 | 5/1917 | Riggs et al. | 123—15 |
| 1,337,218 | 4/1920 | Glaze | 123—15 |
| 1,674,449 | 6/1928 | Riggs | 123—15 |
| 3,155,081 | 11/1964 | Gonzalez | 123—15 |

MARK NEWMAN, *Primary Examiner.*

F. T. SADLER, *Assistant Examiner.*